July 10, 1934.　　　　J. H. FANCHER　　　　1,965,633
SPRAY DEVICE
Filed April 26, 1933
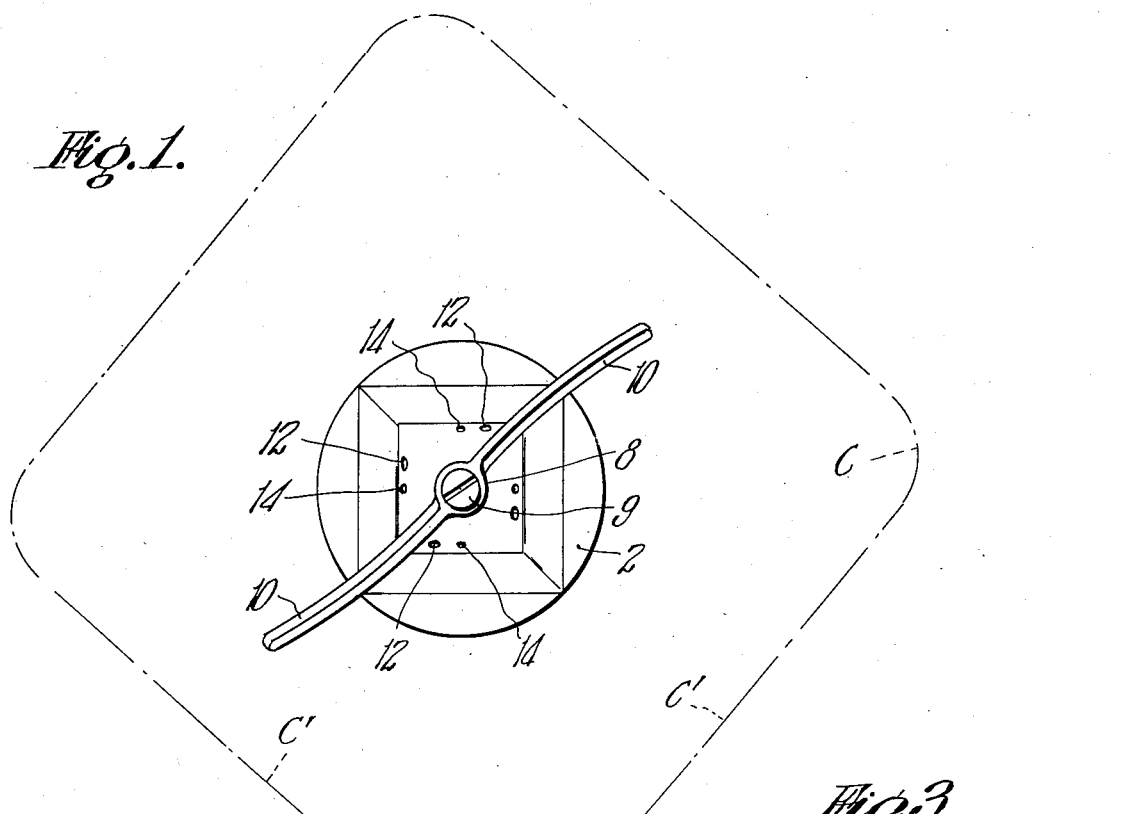
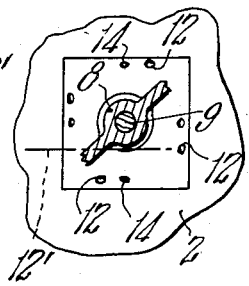
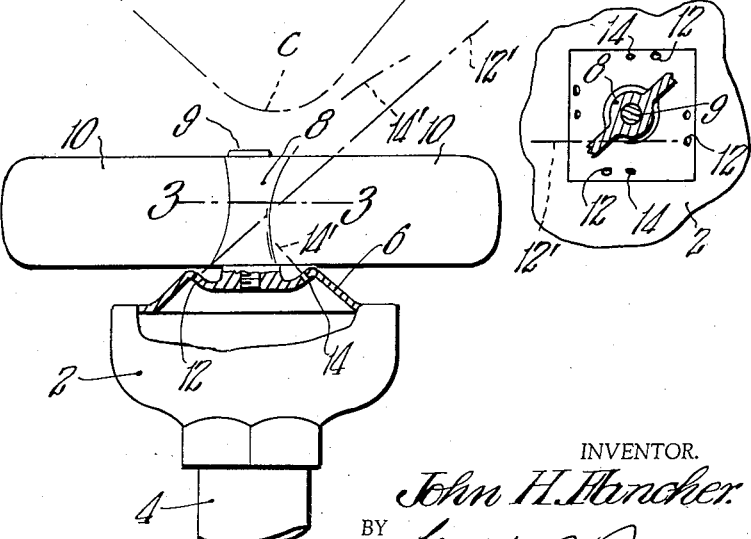
INVENTOR.
John H. Fancher.
BY
Walter C. Ross
ATTORNEY.

Patented July 10, 1934

1,965,633

UNITED STATES PATENT OFFICE 1,965,633

SPRAY DEVICE

John H. Fancher, Chatham, N. J., assignor to Landon P. Smith, Inc., Irvington, N. J., a corporation of New Jersey Application April 26, 1933, Serial No. 668,065

8 Claims. (Cl. 299—18)

This invention relates to improvements in spray devices and is directed more particularly to improvements in lawn sprinkling apparatus.

The invention has for its principal object the provision of novel means whereby more efficient and thorough watering of a lawn is readily and quickly accomplished. As a further object of the invention, my new sprinkling device is adapted to spray a section of lawn which is relatively large and which is rectangular in shape as compared with a circular section of lawn sprayed by some prior art sprinklers.

The advantages of the above and further novel features of the invention will be referred to, for purposes of description, in connection with the accompanying drawing, wherein:

Fig. 1 is a plan view of the device embodying the features of the invention.

Fig. 2 is a side elevational view of the device shown in Fig. 1 with parts in section, and Fig. 3 is a partial plan view on the line 3—3 of Fig. 2.

Referring now to the drawing more in detail, the invention will be fully described.

A head member 2 which is hollowed out or has a bore is supported by some suitable means (not shown) and is connected at its under side to the source of water supply as by a pipe or hose 4 in the usual manner. The head member 2 may be of any form or shape but is preferably adapted to direct the water in a certain way as will be explained.

On the top of the head member 2 is a hollow ridge member 6, which according to the preferred form of the invention is rectangular in shape. This member 6 may be integral with the head and serve as its upper surface or it may be a separate member secured to the body in any well-known manner.

A hub 8 is rotatable on a stud 9 disposed centrally of the member 6. Distributing members 10 which may take the form of propeller blades are adapted to rotate with the hub and be propelled by water discharged thereagainst.

According to the preferred form of the invention, the sides of the hub 8 are curved concavely as shown so that it is of less diameter intermediate its ends than at its extremities. It is thus possible for a stream of water to readily pass by the hub at its central part or be deflected by the hub as will appear.

The ridge member 6, as stated, is preferably rectangular in shape. This is so that necessary discharge ports may be disposed in planes which are substantially parallel and at right angles to one another as shown. That is to say, it is desired, according to the invention to provide discharge ports in the ridge member which are diametrically opposite one another and at opposite sides of the axis of the hub.

As shown in Fig. 3, the discharge ports are preferably disposed in pairs at each side of the ridge member and the ports of each pair are directed upwardly and inwardly in substantially parallel spaced planes.

One port, such as 14, of each pair is directed towards the axis of the hub 12, while the other port such as 12 of each pair is directed in a plane at one side of the hub. Since, as stated, the intermediate portion of the hub is of less diameter than its opposite ends, the ports 12 discharge streams of water which pass by the hub and are thrown across the head, as indicated by dot-dash line 12' in Figs. 2 and 3.

The ports 14, on the other hand, since they are directed towards the axis of the hub, discharge streams of water which hit the rotating and concaved hub and are thrown backwardly, as indicated by dot-dash lines 14' in Fig. 2. These streams of water 14' strike the blades, of course, and cause the propeller to rotate, all of which aids in the distribution of water over an area which is substantially rectangular in shape.

According to the preferred form of the invention, the ports 12, that is the ports directed in a plane at one side of the hub, are larger in diameter than the ports 14 which are directed to the axis of the hub. This is so that the stream of water passing by the hub is substantially greater than the stream striking it directly.

As shown by dot-dash lines in Fig. 1, water emitted from the larger ports 12 goes beyond the hub to form the corners C of a rectangle, while the water from the central ports which strikes the blade, is thrown back thereby to form the sides C' of a rectangle. In this way, I have made it possible to sprinkle a larger lawn in the shape of a rectangle. The propeller functions to diffuse the water discharged by the ports while the ports in general tend to define the shape of the rectangle.

Lawn sprinklers of common form spray circular sections. It has therefore been necessary in order to water the whole lawn to overlap the circles. As a result, certain segments of those circles are necessarily watered more than once and both time and water are wasted.

According to my invention, however, rectangular-shaped sections are watered. By moving my sprinkler about, rectangular-shaped sections may be sprayed so that their marginal edges abut the marginal edges of other sections. Not only is it possible to water a greater area more quickly and without objectionable repetition of certain parts but it is evident that a rectangle has greater area than a circle of the same diameter.

It is to be observed that the above construction may be modified in many particulars without departing from the spirit of the invention. Having described the invention in the form at present preferred, what I now desire to claim and secure by Letters Patent of the United States is:

1. A sprinkling apparatus of the class described comprising in combination, a head having a central hub and provided with sets of ports at opposite sides thereof, the said hub having an intermediate portion of less diameter than an upper portion and sides which curve upwardly and outwardly from said intermediate portion to the upper portion, certain ports being directed upwardly and inwardly towards the intermediate portion of the hub and certain other ports being directed by the sides of said intermediate portion of the hub and closely adjacent thereto, connections between the said hub and head to permit rotation of the former and blades carried by said hub and arranged to pass over said ports as the hub rotates.

2. A sprinkling apparatus of the class described comprising in combination, a head member, a hub member rotatably mounted on said head, said head being provided with certain ports at opposite sides of the axis of said hub member directed upwardly and inwardly towards said hub member and certain other ports directed upwardly and inwardly by the sides of said hub member, and blades carried by said hub member and arranged to pass over said ports as the hub rotates.

3. A sprinkling apparatus of the class described comprising in combination, a head member, a hub member rotatably mounted on said head member, said head member being provided with sets of ports at opposite sides of the hub, each of said sets including a port directed upwardly and inwardly towards said hub and a port directed upwardly and inwardly in a plane by a side of said hub, and blades carried by said hub and arranged to pass over said ports as said hub rotates.

4. A sprinkling apparatus of the class described comprising in combination, a head member, a hub member rotatably mounted on said head member, said head member being provided with ports arranged in sets at opposite sides of the hub, blades carried by said hub member arranged to pass over said ports as said hub rotates and means under said head member for connecting to a water supply, all adapted and arranged whereby water may be discharged through certain of the ports of said sets upwardly and inwardly towards the hub and through the other ports of said sets upwardly and inwardly by the sides of the hub.

5. A sprinkling apparatus of the class described comprising in combination, a head member, a hub member rotatably mounted on said head member, said head member being provided with pairs of ports arranged in parallel planes at opposite sides of the axis of said hub, each of said pairs including a port directed upwardly and inwardly towards the hub and a port directed upwardly and inwardly in a plane by a side of said hub, and blades carried by said hub and arranged to pass over said ports as said hub rotates.

6. A sprinkling apparatus of the class described comprising in combination, a head member, a hub member rotatably mounted on said head member, said head member having oppositely disposed ridge portions on opposite sides of the hub and being provided with oppositely disposed sets of ports extending through said ridge portions, blades carried by said hub member arranged to pass over said ports as said hub rotates and means under said head member for connecting to a water supply, all adapted and arranged whereby water may be discharged through certain of the ports of said sets upwardly and inwardly towards said hub and through the other ports upwardly and inwardly by the sides of said hub.

7. A sprinkling apparatus of the class described comprising in combination, a head member, a hub member rotatably mounted on said head member, oppositely disposed ridge portions on the upper side of said head member at opposite sides of the hub said ridge portions being provided with oppositely disposed pairs of ports extending therethrough, one of the ports of a pair being directed upwardly and inwardly towards said hub and the other being directed upwardly and inwardly by a side of said hub, blades carried by said hub member arranged to pass over said ports as said hub rotates and means under said head member for connecting to a water supply.

8. A sprinkling apparatus of the class described comprising in combination, a head member, a hub member rotatably mounted on said head member, oppositely disposed ridge portions on the upper side of said head member at opposite sides of the hub said ridge portions being provided with oppositely disposed pairs of ports extending therethrough, one port of each pair being of a certain diameter and directed upwardly and inwardly towards said hub and the other port of each pair being of a relatively larger diameter and being directed upwardly and inwardly by the sides of said hub, blades carried by said hub member arranged to pass over said ports as said hub rotates and means under said head member for connecting to a water supply.

JOHN H. FANCHER.